E. F. W. ALEXANDERSON.
ALTERNATING CURRENT MOTOR CONTROL.
APPLICATION FILED JUNE 1, 1908.
927,399.
Patented July 6, 1909.
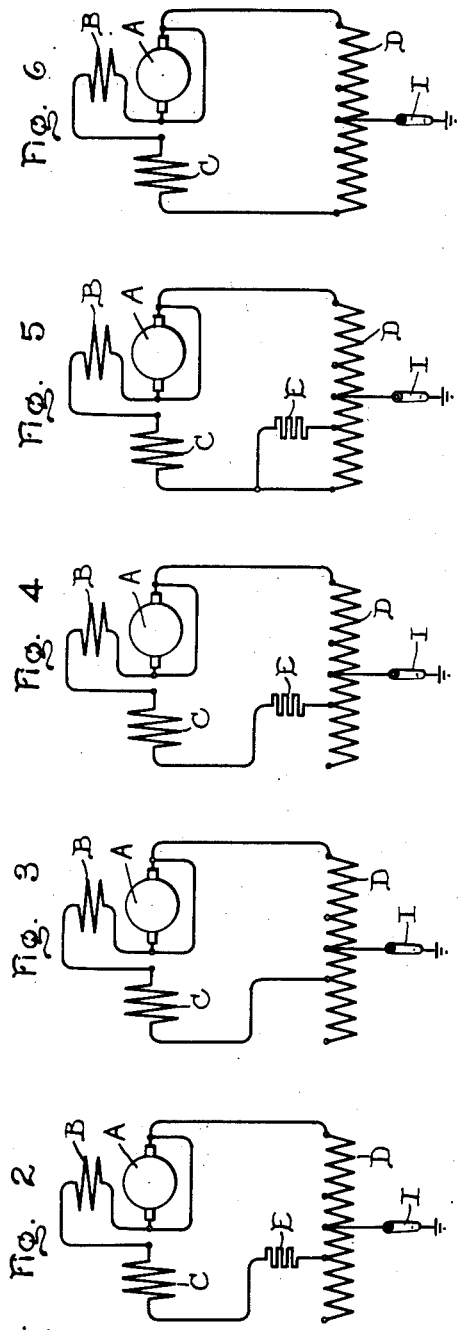
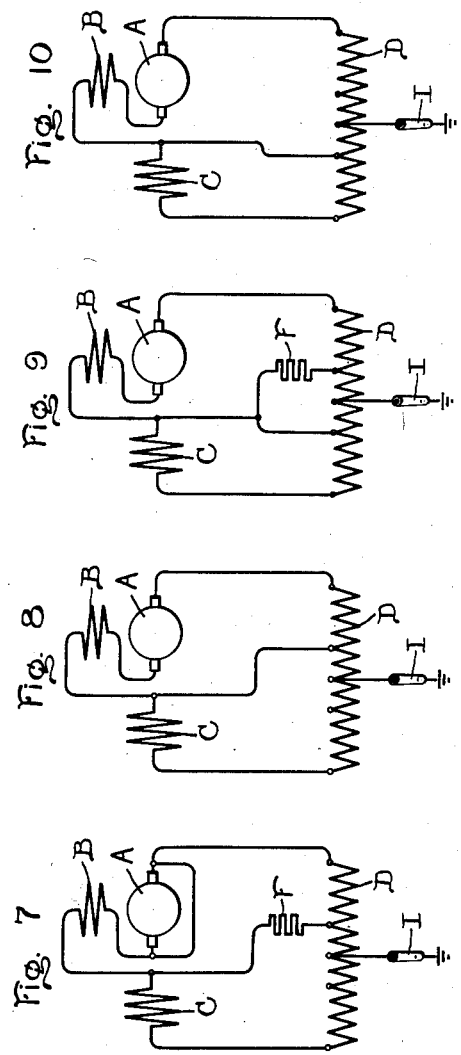
Witnesses
J. Ellis Glen
J. Earl Ryan
Inventor.
Ernst F. W. Alexanderson.
by Albert H. Davis
Atty.

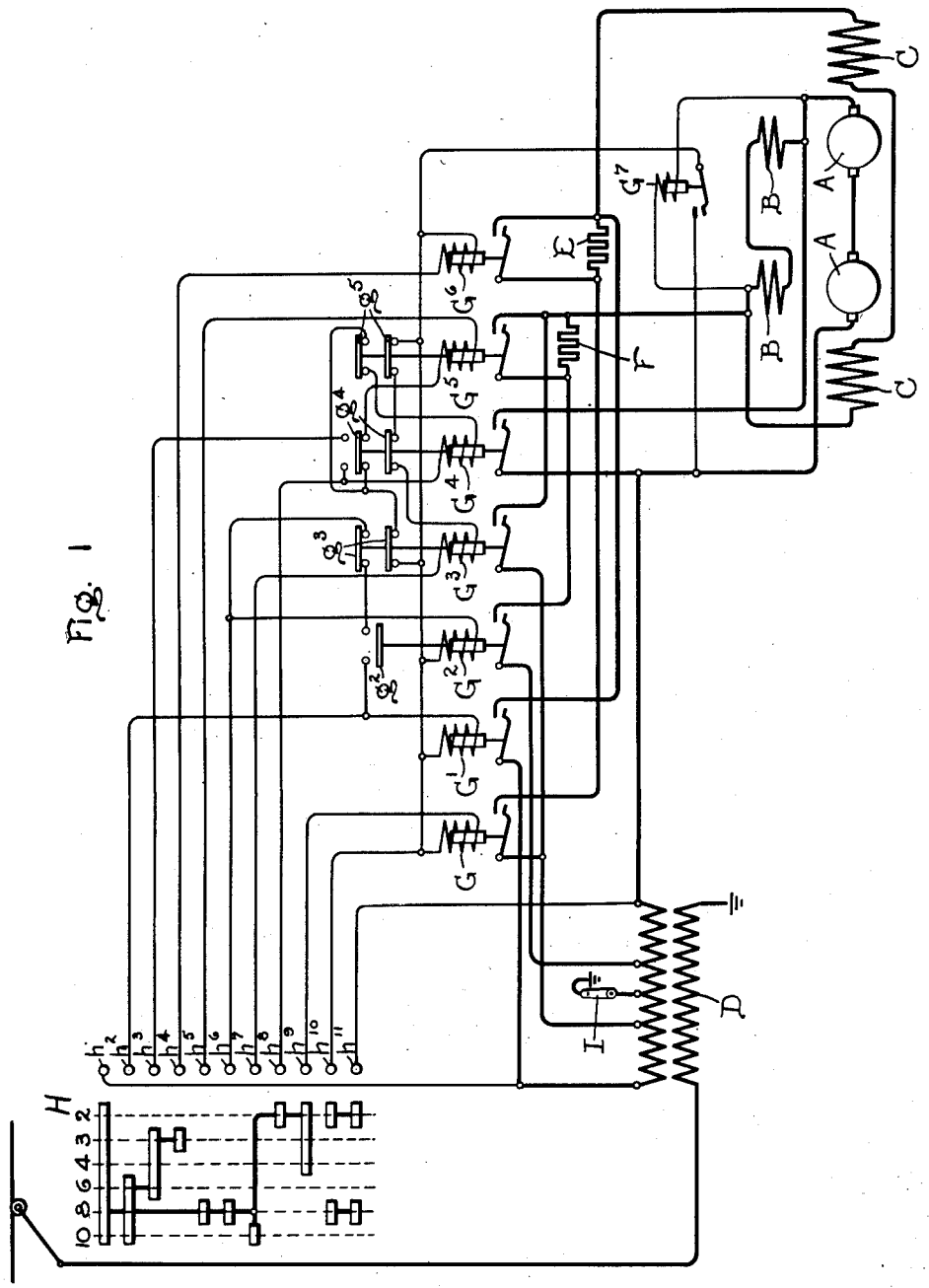

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT-MOTOR CONTROL.

No. 927,399.  Specification of Letters Patent.  Patented July 6, 1909.

Application filed June 1, 1908. Serial No. 435,860.

*To all whom it may concern:*

Be it known that I, ERNST F. W. ALEXANDERSON, a citizen of the United States, residing at Schenectady, county of Schenectady, in the State of New York, have invented certain new and useful Improvements in Alternating-Current-Motor Control, of which the following is a specification.

My invention relates to the control of single-phase motors of the commutator type, and in certain of its features consists in an improvement in the controlling means described in my former application, Serial No. 383,807, filed July 15, 1907, though in certain of its features my present invention is not limited to that particular control.

In my former application I pointed out the fact that in what is known as the repulsion motor, in which the armature is short-circuited, there exists an inducing field which for low speeds has a good effect on commutation, since the electromotive force, induced, by cutting this field, in the armature coils short-circuited by the brushes, opposes the electromotive force due to the transformer action of the exciting or cross-field, but that at high speed the electromotive force due to cutting the inducing field becomes excessive. I, accordingly, disclosed a control system in which, for low speeds, the armature is short-circuited, while at higher speeds an electromotive force is introduced into the armature circuit, which reduces the strength of the inducing field, and also the exciting winding is introduced into the armature circuit in order to produce a field which tends to neutralize commutation reactance.

When a series of connections are employed for low-speed operation, it is desirable that the armature short-circuit should be maintained through the series, but after the controller has passed to a high-speed position, and the motor is operating at high speed, it is then undesirable to reëstablish the armature short-circuit in moving the controller back to the low-speed connections.

My invention in one aspect, accordingly, consists in so arranging the controlling means that the armature short-circuit is established at starting, is maintained through certain subsequent positions of the controller, is then opened, and on the return movement of the controller is not again established until either the starting or off position of the controller is reached.

Another feature of my invention consists in providing means for limiting the motor-speed, particularly on light loads. I accomplish this by means of a magnetically-actuated switch having its magnet winding connected in shunt to the exciting winding of the motor, and consequently supplied with current proportional to the motor current, and arranging this switch so that the motor circuit is interrupted or otherwise suitably modified to prevent further acceleration, as, for instance, by restoring the starting connections when the current in the magnet winding falls below a certain limit. In connection with this magnetically-actuated switch I arrange the controller so that the motor circuit can be energized initially, although the magnet winding of the automatic switch is then deënergized. The controller may also be arranged in certain other positions to render the magnetically-actuated switch inoperative to affect the motor circuits. While this feature of my invention is not necessarily limited to the control described in my former application, it is particularly advantageous when employed in connection with that control, since it may be used both to fix the point at which the motorman must shift the controller from a low-speed to a high-speed position, if he wishes to keep the motor circuit closed; thereby preventing him from operating the motor at high speed with the low-speed connections, which would give faulty commutation, and also to limit the motor-speed when the controller is in its high-speed position.

Still another feature of my invention consists in a novel arrangement of a cut-out switch for the motors. In a prior patent No. 885,128, issued April 21, 1908, I described a control system in which the motors are supplied from the secondary of a step-down transformer, which secondary has its central point grounded, so that by connecting the motors to the secondary on each side of the grounded point, the voltage impressed on the motor circuit may be made twice as great as the static voltage existing between any part of the motor winding and the motor-frame, which is, of course, grounded.

One feature of my invention consists in the insertion of a cut-out switch in this ground connection of the transformer secondary. By the use of this switch I am enabled to avoid the cut-out switch usually employed on electric cars and locomotives to cut one motor or pair of motors out of circuit when it is disabled. The reason why I can dispense with the cut-out switch is that the failure of a motor is ordinarily due to a ground between one of the motor windings and the frame. With the motor circuit connected to the supply transformer through ungrounded leads, but with the transformer itself grounded, a single ground in the motor winding will produce a short-circuit, but by opening the cut-out switch in the ground connection of the transformer, the short-circuit is opened, and the motor may be operated for the rest of the trip, since a single ground on an otherwise ungrounded circuit does no harm.

My invention will best be understood by reference to the accompanying drawings, in which—

Figure 1 shows diagrammatically a pair of motors provided with controlling means arranged in accordance with my invention; and Figs. 2 to 10 are diagrams of the circuit-connections established by the control apparatus of Fig. 1, only a single motor being shown in these diagrams for the sake of simplicity.

Referring first to Fig. 2, A represents the armature, B the exciting winding, and C the inducing winding of a single-phase commutator motor. The winding C, which acts as the inducing winding for repulsion-motor operation, would commonly be termed the "compensating" winding in series-motor operation, but to avoid unnecessary words, I shall simply term this winding the "inducing" winding, with the understanding that the term applies both to repulsion and compensated series motors, and designates a winding which produces an electromotive force in line with that of the armature. D represents a transformer for supplying current to the motor. E represents a resistance. In this figure, which shows the starting connections, the motor windings are connected in series with each other and with the resistance E across the portion of a transformer D, but with the armature A short-circuited,—that is, the motor is connected as a repulsion motor, with the resistance E serving as a starting resistance to limit the starting current.

Fig. 3 differs from Fig. 2 only in that the resistance E is cut out of circuit.

Fig. 4 is a transitional connection with the resistance E momentarily cut into circuit again.

In Fig. 5 the motor circuit is connected across the whole transformer winding, the resistance E being shunted across a portion of the winding, and thereby enabling the change to be made without opening the motor circuit.

In Fig. 6 resistance E is out of circuit. This figure represents the last of the series of low-speed connections.

Fig. 7 shows a transitional connection in which a resistance F is connected between the junction-point of the compensating winding C and of the rest of the motor circuit and an intermediate point on the transformer.

In Fig. 8, which is the first running position in the high-speed series of connections, the armature short-circuit is opened and the resistance F is cut out of circuit. A shunt voltage derived from the transformer D is now impressed across the armature A and exciting winding B in series.

Fig. 9 is a transitional connection, resistance F being cut back into circuit and shunted across a portion of the transformer winding D, so that when the resistance is again cut out of circuit, as in Fig. 10, a higher voltage is impressed on the armature and exciting winding without having opened the motor circuit.

The connections as described above have all been disclosed in prior applications of mine. My present invention lies in certain novel features in the control apparatus through which these connections are made. This control apparatus is shown diagrammatically in Fig. 1. In this figure, two motors are shown with their several windings indicated by the same reference letters as in Figs. 2 to 10. Eight magnetically-connected switches of contactors G to $G^7$ are provided for making the several changes in the motor circuits. Certain of these contactors are provided with interlocking contacts $g^2$ to $g^5$, for the purpose of insuring the proper sequence of operations. The arrangement of these interlocking contacts, except for one addition, which will be mentioned later, is the same as that described in my prior application, Serial No. 409,271, filed January 4, 1908.

H represents the master-controller, which is shown diagrammatically with its contacts developed in a plane surface. This switch comprises eleven contact fingers $h^1$ to $h^{11}$, and movable contacts as shown, the several positions of the switch being indicated by dotted lines numbered to correspond with the figures which show the circuit connections established by the switch in those positions.

I represents a cut-out switch, which is inserted in a connection from the middle-point of the secondary transformer D to ground.

Seven contactors G to $G^6$ are controlled by the master-controller, and form the manually-controlled part of the control apparatus. The eighth contactor G⁷ has its actuating winding connected in shunt to the exciting windings B B of the motors, and consequently is automatic in its operation; responding to variations in current in the motors, since it has impressed on its terminals a voltage proportional to the voltage across the exciting windings of the motors, which, in its turn, is proportional to the motor current. It is this contactor which serves to prevent the motor from being operated at too high a speed with low-speed connections, and from passing a certain speed-limit with the high-speed connections.

When the switch H is moved to its first running position, indicated by the dotted line 2, a circuit is closed from the left-hand terminal of the secondary of transformer D through contact $h^1$, contact $h^8$, contactor G⁴, upper contact $g^5$, lower contact $g^3$, contact $h^{10}$, contact $h^{11}$, to the right-hand terminal of the secondary of transformer D. A circuit is also closed from transformer D through contacts $h^1$ and $h^9$, contactor G, contact $h^{10}$, contact $h^{11}$, to transformer D. Contactors G⁴ and G are consequently energized, contact G⁴ short-circuiting the motor armatures and contact G connecting one terminal of the motor circuit to an intermediate point on transformer D, as shown in Fig. 2. When switch H is moved from position 2 to position 3, the circuit of contact $h^8$ is opened, but this does not deënergize contactor G⁴, since a maintaining circuit has now been closed through upper contact $g^4$ and contact $h^3$. Furthermore, although the circuit of contacts $h^{10}$, $h^{11}$ has been opened, this does not affect either of the contactors energized, since contactor G⁷ is now energized by the voltage existing across the terminals of the exciting windings B, B, and its contact serves, instead of the master-controller, to connect the contactors to the right-hand terminal of the secondary of transformer D. The change that is made by moving switch H from position 2 to position 3 is closing an additional circuit through contacts $h^1$ and $h^4$, contactor G⁶ and the contact of contactor G⁷ to the right-hand terminal of transformer D. Contactor G⁶ is consequently energized, short-circuiting resistance E and establishing the connections shown in Fig. 3.

In position 4 of the master-controller H, the transitional connections of Fig. 4 are established, contactor G⁶ being deënergized, and resistance E again being cut into circuit. In passing from position 4 to position 6, the first change occurs when a circuit is closed through contacts $h^1$, $h^2$, contactor G¹ and contact of contactor G⁷. This energizes contactor G¹ and establishes the connections shown in Fig. 5. The circuit of contact $h^9$ is then broken, dropping contactor G, and establishing the connections of Fig. 6. This is the last of the low-speed connections. It will be seen that contactor G⁴, which short-circuits the motor armatures, has been maintained energized by its maintaining contacts throughout the various circuit changes, but that if the movement of switch H is continued to establish the high-speed connection, contactor G⁴ will be deënergized by the opening of the circuit of contact $h^3$, and that on the reverse movement of switch H, contactor G⁴ will not again be energized until the starting position is reached and contact $h^8$ is again closed; for, although contact $h^3$ will engage its coöperating movable contact on this reverse movement, its circuit is opened at the upper contact $g^4$. It is the addition of the stationary contacts engaging the upper contact $g^4$ and serving as maintaining contacts for contactor G⁴ that marks the only difference between the arrangement of the interlocking contacts shown in this application, and the arrangement shown in my prior application, Serial No. 409,271, above referred to.

If controlling switch H is maintained in the position indicated by dotted line 6,— that is, the last of the low-speed positions, and if the load on the motors is light, as, for instance, in the case of a locomotive running light, so that the speed of the motors passes above the limit for good commutation with low-speed connections, contactor G⁷ will open the motor circuit, since the voltage at the terminals of the exciting windings B, B, will fall to an amount insufficient to hold the contactor closed, and the opening of its contacts disconnects the windings of all the contactors from the right-hand terminal of the secondary of transformer D. The motorman can close the motor-circuit again, only by returning the master-controller to starting position, or moving it to the first high-speed position indicated by dotted line 8. In either of these positions a circuit is closed through contacts $h^{10}$ and $h^{11}$ to the secondary of transformer D, so that the contactor G⁷ is rendered inoperative to affect the motor circuit.

If the master-controller is moved to the position indicated by the dotted line 8, several operations of the contactors result, producing several transitional connections before establishing the running connection corresponding to this position of the switch, as shown in Fig. 8. Contacts $h^5$ and $h^6$ are simultaneously energized, but the contactor G⁵ connected to contact-finger $h^5$ is not at first actuated, since its circuit is open at the upper contact $g^4$ of contactor G⁴, unless contactor G⁷ has dropped its contact, so as to deënergize all the contactors. Contactor G² is, however, energized, thereby establishing a connection from the junction of exciting winding B and inducing winding C through resistance F to an intermediate point on transformer D, thereby producing the transitional connections shown in Fig. 7. Nothing further happens until contact-finger $h^3$ has its circuit opened, when contactor $G^4$ drops. The dropping of contactor $G^4$ causes contactor $G^5$ to pick up, its circuit being closed through contact-fingers $h^1$, $h^5$, contactor $G^5$, upper contact $G^4$, lower contact $g^3$, and contacts $h^{10}$ and $h^{11}$. The picking up of contactor $G^5$ short-circuits resistance F and establishes the connections of Fig. 8, which are the running connections for this position of the master-controller. It will be noted that the successive operations of contactors $G^2$, $G^4$ and $G^5$ follow automatically in their proper sequence, because of their interlocking connections and contacts.

When switch H is moved to its final position, indicated by dotted line 10, contact-finger $h^7$ is energized; but contactor $G^3$ does not pick up immediately, since its circuit is open at lower contact $g^5$. As soon as contact-finger $h^5$ leaves its movable contact, contactor $G^5$ is deënergized, opening the short-circuit around resistance F. The closing of lower contact $g^5$ energizes contactor $G^3$, which picks up, producing the connections of Fig. 9. Contact-finger $h^6$ has been deënergized before this, but contactor $G^2$ does not fall until after contact $G^3$ picks up, on account of the maintaining circuit formed from the lower terminal of contactor $G^2$, through upper contact $g^3$ and contact $g^2$ to contact-finger $h^2$. As soon as contactor $G^3$ picks up, this circuit is broken, and contactor $G^2$ drops, thereby establishing the connections of Fig. 10.

The interlocking contacts serve to produce the proper sequence of operations, not only while the contact H is moved from off to its highest speed running position, but also when it is moved in the opposite direction. The contactor operations which occur during the movement of the master-switch need not be described in detail, since they will be clear from the drawings, from what has already been said. It will be noted that the maintaining circuit for contactor $G^2$, formed by contacts $g^3$, $g^2$ and $h^2$, prevents the contactor from opening until the circuit of contact $h^2$ is open, thereby deënergizing contactor $G^1$ and cutting resistance E into circuit.

In normal operation, the cut-out switch I is maintained closed, thereby grounding the central point of the secondary of transformer D. The purpose of this ground connection, as has already been explained, and as is disclosed in my prior patent No. 885,128 above referred to, is to keep the static strain between any part of a motor winding and the frame not more than half the potential across the terminals of the transformer secondary. If, however, any of the motor windings should develop a ground in operation, the resulting short-circuit may be removed by opening switch I. Thus, it is not necessary to cut the grounded motor out of circuit. Accordingly, the usual cut-out switch, which adds considerable complication to the circuit connections, may be dispensed with.

In the drawings, I have shown the motors diagrammatically, without illustrating their structure, which in its preferred form is shown in my former application, Serial No. 383,807, above referred to. While I have shown a single pair of motors in Fig. 1, it will be understood that as many pairs of motors as may be desired may be controlled by the control described. Furthermore, it will be noted that the usual reversing switch is omitted from the diagram for the sake of simplifying it.

I do not desire to limit myself to the particular connections and arrangement of parts here shown, but aim in the appended claims to cover all modifications which are within the scope of my invention.

Having now fully described my invention, what I claim as new and desire to secure by Letters Patent, is:

1. In combination with an alternating-current motor of the commutator type, a controller therefor arranged in one position to short-circuit the motor armature, in a second position to maintain said armature short-circuited while varying the motor connections, in a third position to open the short-circuit, and to keep said short-circuit open in passing through said second position in the opposite direction.

2. In combination with an alternating-current motor of the commutator type, a magnetically-actuated switch arranged when energized to short-circuit the motor armature, an energizing circuit therefor, a maintaining circuit therefor including contacts controlled by said switch, and a master switch arranged in one position to close said energizing circuit, in a subsequent position to break said energizing circuit, and in a still subsequent position to break said maintaining circuit.

3. In combination with an alternating-current motor of the commutator type, a magnetically-actuated switch arranged when energized to short-circuit the motor armature, auxiliary contacts on said switch, and a master controller having its contacts arranged in one position to close an energizing circuit for said magnetically-actuated switch independent of said auxiliary contact, in a subsequent position to close a second energizing circuit through said auxiliary contacts and to break the first energizing circuit, and in a still subsequent position to break the second energizing circuit.

4. In combination with an alternating-current motor of the commutator type, manually-controlled controlling means therefor arranged to short-circuit the motor armature at starting and to open said short-circuit for operation at high speeds, and an automatic controlling switch having an actuating winding connected in shunt to a field winding of the motor.

5. In combination with an alternating-current motor of the commutator type, manually-controlled controlling means therefor arranged to short-circuit the motor armature at starting and to open said short-circuit for operation at high speeds, and means for automatically modifying the motor circuit connections when the motor-speed exceeds a predetermined limit.

6. In combination with an alternating-current motor of the commutator type, a magnet winding supplied with a current proportional to the current in the motor, means controlled by said magnet winding for modifying the motor circuit connections when the current in said winding falls below a predetermined limit, and a manually-operated controller for said motor arranged in certain of its positions to render said magnet winding inoperative to affect the motor circuits.

7. In combination with an alternating-current motor of the commutator type, a magnet winding supplied with a current proportional to the current in the motor, means controlled by said magnet winding for modifying the motor circuit connections when the current in said winding falls below a predetermined limit, and a manually-operated controller for said motor arranged in certain of its positions to close said motor circuit initially independently of said means.

8. In combination with an alternating-current motor of the commutator type, a magnet winding connected in shunt to a field winding of the motor, means controlled by said magnet winding for modifying the motor circuit connections, and a manually-operated controller for said motor arranged in its starting position to close the motor circuit initially independently of said means.

9. In combination with an alternating-current motor of the commutator type, a magnet winding connected in shunt to a field winding of the motor, means controlled by said magnet winding for modifying the motor circuit connections, and a manually-operated controller for said motor arranged in certain of its positions to render said magnet winding inoperative to affect the motor circuits.

10. In combination with an alternating-current motor of the commutator type, an automatic controlling switch having an actuating winding connected in shunt to a field winding of the motor, and a manually-controlled controller for the motor arranged in certain of its positions to render said automatic switch inoperative to affect the motor circuits.

11. In combination with an alternating-current motor of the commutator type, an automatic controlling switch having an actuating winding supplied with current proportional to the motor current, and a manually-controlled controller for the motor arranged in certain of its positions to render said automatic switch inoperative to affect the motor circuits.

12. In combination with an alternating-current motor of the commutator type, a manually controlled controller for the motor arranged to establish a series of low-speed connections and a series of high-speed connections, and an automatic controlling switch having an actuating winding supplied with current proportional to the motor current, said manually-controlled controller being arranged, when establishing the first set of connections of each series to render said automatic switch inoperative to affect the motor circuits.

13. In combination with an alternating-current motor of the commutator type, a manually-controlled controller for the motor arranged to establish a series of low-speed connections and a series of high-speed connections, and an automatic controlling switch having an actuating winding connected in shunt to a field winding of the motor, said manually-controlled controller being arranged when establishing the first set of connections of each series to render said automatic switch inoperative to affect the motor circuit.

14. In combination with an alternating-current motor of the commutator type, manually-controlled controlling means therefor arranged to short-circuit the motor armature at starting and to open the short-circuit for operation at high speeds, and an automatic controlling switch having an actuating winding supplied with current proportional to the motor current and arranged to modify the motor circuit connections when said current falls below a predetermined limit.

15. In combination with a plurality of alternating-current motors, a transformer for supplying current to said motors, a circuit containing said motors, ungrounded leads from both terminals of said circuit to the secondary of said transformer, a ground connection to a point on said secondary, and means for opening said ground connection.

16. In combination with a plurality of alternating-current motors, a transformer for supplying current to said motors, a circuit containing said motors, ungrounded leads from both terminals of said circuit to the secondary of said transformer, a ground connection to a point on said secondary, and a cut-out switch in said ground connection.

17. In combination with a plurality of alternating-current motors, a transformer for supplying current to said motors, a circuit containing said motors, ungrounded leads from both terminals of said circuit to the secondary of said transformer, a ground connection to a point on said secondary intermediate the points to which said leads are connected, and a cut-out switch in said ground connection.

In witness whereof, I have hereunto set my hand this 29th day of May, 1908.

ERNST F. W. ALEXANDERSON.

Witnesses:
BENJAMIN B. HULL,
HELEN ORFORD.